United States Patent

[11] 3,599,691

| [72] | Inventor | Norman J. Hughes<br>Melrose, Mass. |
|---|---|---|
| [21] | Appl. No. | 837,504 |
| [22] | Filed | June 30, 1969 |
| [45] | Patented | Aug. 17, 1971 |
| [73] | Assignee | TRW Inc.,<br>Cleveland, Ohio |

[54] FLANGED NUT WITH ATTACHING PRONGS
2 Claims, 5 Drawing Figs.

[52] U.S. Cl. .................................................. 151/41.73
[51] Int. Cl. .................................................. F16b 39/282
[50] Field of Search .......................................... 151/41.73,
41.72; 85/49.13, 13

[56] References Cited
UNITED STATES PATENTS

| 2,117,308 | 5/1938 | Frey .............................. | 85/13 |
| 2,433,914 | 1/1948 | Lang .............................. | 85/49 |
| 3,480,061 | 11/1969 | Leistner ....................... | 151/41.73 |
| 3,382,752 | 5/1968 | Black et al. .................. | 85/13 |

FOREIGN PATENTS

| 914,529 | 1/1963 | Great Britain ................ | 151/41.73 |

Primary Examiner—Edward C. Allen
Attorneys—Philip E. Parker, Gordon Needleman, James R. O'Connor, John Todd and Hall and Houghton

ABSTRACT: A flanged nut having attaching prongs disposed in cooperating pairs, the prongs of each pair are disposed in face-to-face relationship and are curled inwardly toward each other and the threaded shank of the nut.

INVENTOR
NORMAN J. HUGHES
BY
James R O'Connor
ATTORNEY

FLANGED NUT WITH ATTACHING PRONGS

BACKGROUND OF THE INVENTION

1. Field of the Invention

The invention relates to flanged nuts of the type having integral attaching prongs for securing the nut to an apertured, fibrous workpiece, for example, one formed from wood or a wood substitute.

2. Description of the Prior Art

The prior art includes a number of flanged nuts carrying integral attaching prongs. In most cases the prongs are sheared from the peripheral edge of the flange and wiped up toward the threaded, tubular shank of the nut so that the prongs extend perpendicularly from the flange and lie parallel to the axis of the tubular shank throughout their length. Further, the shearing and wiping operations are carried out in a singular direction, i.e. either consistently clockwise or consistently counterclockwise, around the periphery of the nut flange so that the prongs ultimately lie in a sequential face-to-back relationship with respect to each other. Due to the aforesaid orientation of the prongs, the gripping of a fibrous, apertured workpiece by the embedded prongs has often proved unsatisfactory in that the prongs are axially driven straight into the workpiece in the manner of a nail or if they bend or deflect at all when driven, they tend to bend in the same direction so that the distance between the pronged ends of the seated nut remain substantially the same as prior to its assembly with the workpiece. Consequently, the prongs can easily track out of the workpiece with a resulting dislodgment of the nut therefrom if the end of the threaded shank is forcibly struck by a mounting bolt or screw during the fastening of a part to the workpiece, particularly in situations where the bolt or screw is being driven by an automatic power tool. One will appreciate that this accidental dislodgment of the nut can be rather exasperating experience in situations wherein the surface of the workpiece against which the nut flange bears is unavailable at the time of insertion of the mating bolt or screw. Further, since the prongs of the above described prior art devices which, in the commercial versions, may vary from three to eight in number, are usually equally spaced about the periphery of the flange, the nuts are not conductive to automatic feeding from a hopper to a track for carriage to automatic nut applying tools, in that the flange does not present a distinct surface for registration with a hopper discharge slot and a parallel sided track.

In one of the known devices, the prongs are substantially longer than the threaded shank of the nut and are driven completely through the workpiece in which the nut is installed and thereafter curled over the remote face of the workpiece by an anvil or other appropriate tool. While this particular nut provides for improved retention and resistance to dislodgment, the curled over prong ends substantially inhibit flush mounting of an attached part against the workpiece surface remote from the nut flange.

There is one known socket or flange nut, which is designed primarily for use in securing cleats or calks to the soles of athletic shoes, wherein the prongs are sheared and wiped up in opposite lateral directions from the ends of the nut flange so that the prongs lie in face-to-face relationship. However, like the previously mentioned nuts, the prongs lie perpendicular to the nut flange and parallel to the axis of the threaded shank, and the opposed prongs are spaced from each other a distance substantially greater than the diameter of the threaded shank. Thus there is little or no cooperative engagement of the shoe sole in which the nut is embedded by the prongs and the part is subject to easy tracking out of the sole if the end of the shank is impacted by the mounting bolt of a cleat or calk during insertion.

The present invention provides an improved pronged nut construction which obviates the deficiencies in the prior art devices as will become evident from a reading of the description of a preferred embodiment which follows in conjunction with a viewing of the accompanying drawing.

SUMMARY OF THE INVENTION

A sheet metal nut according to the invention includes a base flange, a tubular, threaded shank extending from one face of the base flange and a plurality of attaching prongs joined to the flange and extending therefrom in the general direction of the shank and in spaced relationship with respect to the shank. The prongs are disposed in cooperating pairs with the prongs of each pair being in opposed face-to-face relationship. The prongs of each cooperating pair are curled inwardly toward each other so that their free terminal ends are spaced from each other a distance less than their ends adjoining the flange. In the preferred embodiment of the invention, each of the prongs is also curled inwardly toward the threaded shank of the nut and the prongs of each cooperating pair are spaced from each other a distance less than the external diameter of the threaded shank.

DESCRIPTION OF A PREFERRED EMBODIMENT

Figure 1:
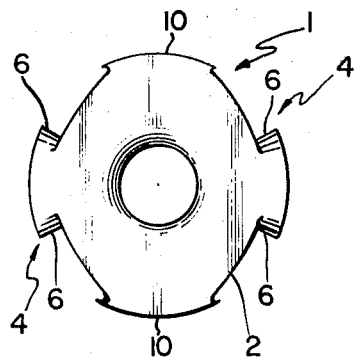
FIG. 1 is a plan view of a flanged nut according to the invention looking on the end of the threaded, tubular shank of the nut.

Referring to the invention as illustrated in the drawing, the nut 1, which is of sheet metal construction, includes a base flange 2, a tubular shank 3 drawn from the material of the base flange and extending perpendicularly from one face thereof, and a plurality of attaching prongs 4 which are sheared from the periphery of the base flange and wiped up in the general direction of the tubular shank but lie in spaced relationship to the shank. The tubular shank 3 carries an internal, conventional thread for engaging a conventionally threaded machine screw or bolt. However, the shank might alternatively carry a rolled or swaged thread and the thread might be of the complementary thread cutting type for engaging an unthreaded machined or cast shank of a cooperating fastener or stud carrying part.

Figure 2:
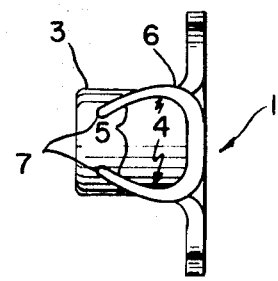
FIG. 2 is a side elevation of the flanged nut as seen from the right of FIG. 1.
Figure 3:
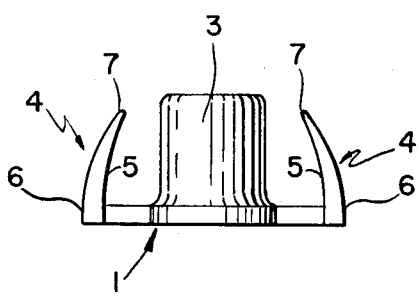
FIG. 3 is an end elevation of the nut as seen from the bottom of FIG. 1.

The prongs 4 are sheared from the opposite ends of the flange 2 so that they are ultimately disposed in cooperating pairs and the faces 5 of the prongs of each pair, as opposed to the backs 6 thereof, are in opposing relationship. The tools, constituting a cooperating punch and cutting die (not shown) which are utilized to shear and bend the prongs from the flange are so constructed that the prongs of each cooperating pair are curled inwardly toward each other during their formation and each of the prongs is also curled or deflected inwardly toward the threaded shank 3. Thus, as is clearly depicted in FIGS. 2 and 3, the free terminal ends 7 of each cooperating pair of prongs are spaced from each other a distance less than their ends adjoining the flange, and the terminal ends of each prong are spaced from the shank 3 a distance less than their ends adjoining the flange. All of the prongs are of a length greater than one half the length of the shank 3 and the opposed faces 5 of the prongs of each cooperating pair are spaced a distance less than the external diameter of the shank.

Figure 4:
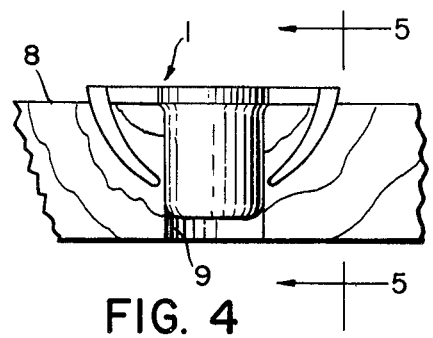
FIG. 4 is a view of an installation depicting the nut as seen in FIG. 3 seated in a fragmentary section of an apertured wooden workpiece.
Figure 5:
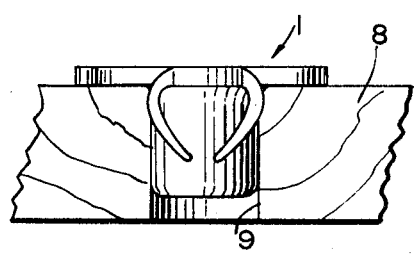
FIG. 5 is a section taken on line 5–5 of FIG. 4 with the nut shown in side elevation.

The nut 1 is affixed to a wooden workpiece 8 having an aperture 9 formed therethrough, as depicted in FIGS. 4 and 5, by inserting the free leading end of the shank 3 into the aperture 9 and thereafter striking the outer surface of the flange 2 with an appropriate tool until the prongs 4 are embedded in the workpiece for their full length and the surface of the flange 2 adjacent the shank is flush against the outer surface of the workpiece. Due to the improved construction and arrangement of the prongs 4, the prongs of each cooperating pair are curled further toward each other in the manner of a staple and each of the prongs is also bent further inwardly toward the shank of the nut. Thus the prongs cooperatively and in combination with the shank overlap and securely grip substantial portions of the wood material adjacent the aperture 9 in the workpiece and thereby provide substantially increased resistance to push out or dislodgment of the nut therefrom.

As is best seen in FIG. 1, the shearing of the prongs from the flange in the manner described heretofore leaves a pronounced projection 10 on the ends of the flange intermediate the prongs and the projections 10 provide distinct surfaces which can be keyed to the discharge slot in a hopper back and which will readily register with the parallel sides of a transporting track for automatic feeding and carriage of the nut to automatic impacting tools for applying the nut to a workpiece.

I claim:

1. A sheet metal nut comprising a base flange, a tubular, threaded shank extending from one face of said flange, and a plurality of attaching prongs sheared from said base flange and bent in the general direction of said shank and lying in spaced relationship to said shank, said prongs being disposed in cooperating pairs with the prongs forming each pair being in opposed face-to-face relationship, the prongs of each pair being curled inwardly toward each other so that the free terminal ends thereof are spaced from each other a distance less than the ends joining said flange, said prongs also being curled inwardly toward said shank in a continuous arc extending from their ends adjoining said base flange to their free ends, each prong of each cooperating pair having a concavo-convex configuration and describing a continuous arcuate contour from its end adjoining said base flange to its free end, the concave face of each prong being disposed opposite the concave face of the other prong of the pair.

2. A sheet metal nut according to claim 1 wherein the prongs of each of the cooperating pairs are spaced from each other a distance less than the external diameter of said shank.